Aug. 1, 1939.  E. V. HAWKINS ET AL  2,168,099
PLANT AND INSECT ERADICATOR
Filed June 2, 1938  2 Sheets-Sheet 1

Inventors
E. V. Hawkins
Sam Indermuhle

By Clarence A. O'Brien
and Hyman Berman
Attorneys

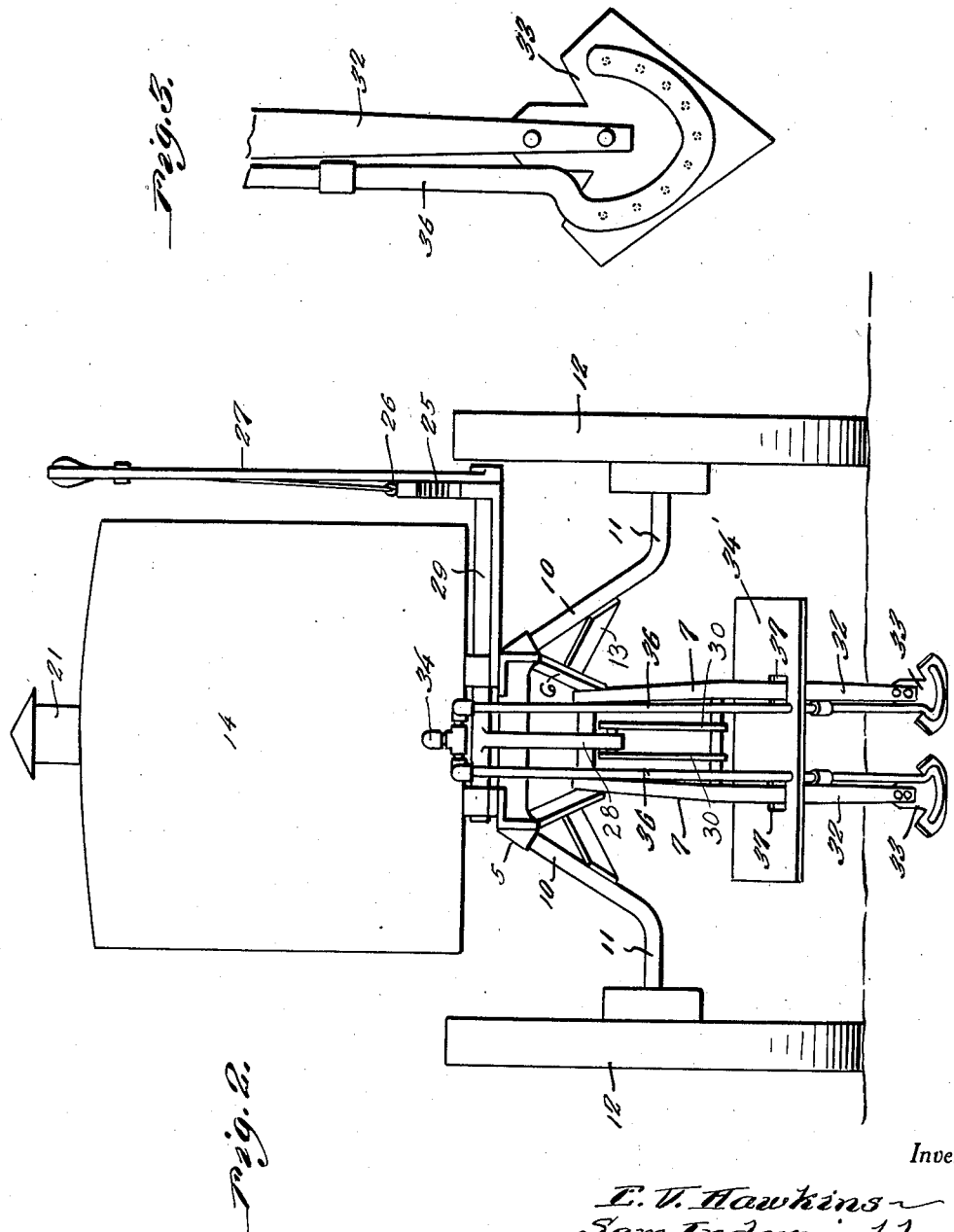

Patented Aug. 1, 1939

2,168,099

UNITED STATES PATENT OFFICE 2,168,099

PLANT AND INSECT ERADICATOR

Elvin V. Hawkins and Sam Indermuhle,
Ellensburg, Wash.

Application June 2, 1938, Serial No. 211,432

1 Claim. (Cl. 111—7)

This invention appertains to new and useful improvements in apparatus for eradicating obnoxious plant and insect life from cultivated lands.

The principal object of the present invention is to provide apparatus whereby a direct application of steam is given to the sub-soil for killing roots and obnoxious insects.

Another important object of the invention is to provide an apparatus of the character stated which is of simple construction and easy to operate.

These and various other important objects and advantages of the invention will become apparent to the reader of the following specification.

In the drawings:—

Figure 2 is a rear elevational view.

Figure 3 is a rear elevational view of one of the shovels.

Figure 1:
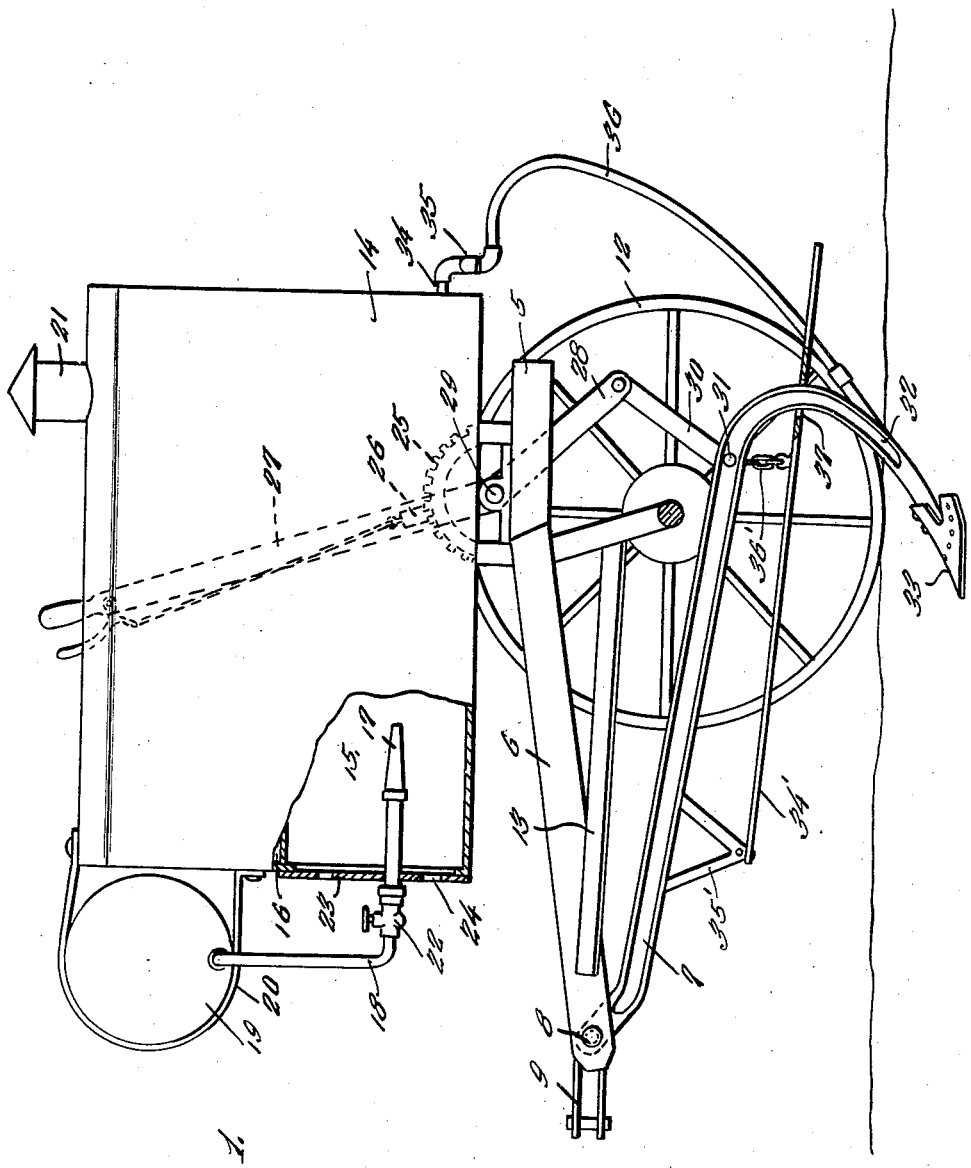
Figure 1 represents a side elevational view with a portion broken away.

Referring to the drawings wherein like numerals designate like parts, it can be seen that numeral 5 represents a base structure from which extends forwardly the pair of bars 6 and between the forward ends of these bars 6 are disposed the forward ends of the beams 7, the pin 8 being disposed through the forward ends of the bars 6 and beams 7. A suitable hitch 9 can be provided at this end.

Axle bars 10—10 extend downwardly from the base 5 and laterally as at 11 and on these lateral portions are mounted the wheels 12. Extending from the forward end portions of the bars 6 are the brace members 13 which are suitably secured as by welding to the downwardly disposed portions 10 of the axle bars.

The shell 14 is mounted on the base 5 and contains the fire chamber 15 above which is the boiler 16 and into this fire chamber 15 extends the burner 17 having the feed line 18 from the fuel tank 19 which is strapped in place as at 20 to the forward end of the shell 14. A vent 21 is provided at the top of the shell 14 for the fire chamber 15. The supply pipe 18 has the control valve 22 therein. The lower end of the pipe 18 extends through the door 23 and this door has air openings 24 therein and through which a suitable amount of air can pass to the chamber 15.

Mounted on the base 5 is the quadrant gear 25 with which the detent 26 on the hand lever 27 can engage, the lower end of this hand lever 27 being provided with the depending leg 28 extending downwardly from the shaft 29 which is operated by the hand lever 27. Pivotal link members 30 extend downwardly from the leg 28 and through the lower portions of these links 30 extends the pin 31 which also passes through the rear portions of the beams 7. The rear end portions of the beams curve downwardly and forwardly as at 32 and are equipped at their lower ends with the sub-soil shovels 33.

From the boiler 16 extends the steam supply pipe 34 which is connected by the fitting 35 to the branch lines 36 each of which extends downwardly to the corresponding shovel 33 where it is secured across the bottom side of the shovel and has openings therein registering with openings through the shovel. Obviously, when the machine is in operation steam will be supplied to the shovels and will discharge through the face thereof for killing insects both below and above the soil, and to keep the steam in contact with the top of the soil, a deflector plate 34' is employed, the forward end of this being suspended by a bracket 35'. The plate 34' slopes rearwardly and is connected to the pin 31 by a short chain 36'. The curved portions 32 of the beams 7 extend through openings 37 in the said deflector plate 34.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A plant and insect exterminator comprising a frame, a ground-engaging plow depending from the frame, a boiler mounted on the frame, a conduit extending from the boiler, said plow having openings extending therethrough, said conduit extending to a point behind the plow and having its end closed, the portion of the conduit behind the plow being formed with openings registering with the openings of the plow, a substantially horizontal deflector plate, having an opening therein, said plate being supported by the frame, said plow having a shank extending through the opening of the plate, said plate opening being oversize to permit freedom of motion of the shank without affecting the deflector plate.

ELVIN V. HAWKINS.
SAM INDERMUHLE.